No. 741,315. Patented October 13, 1903.

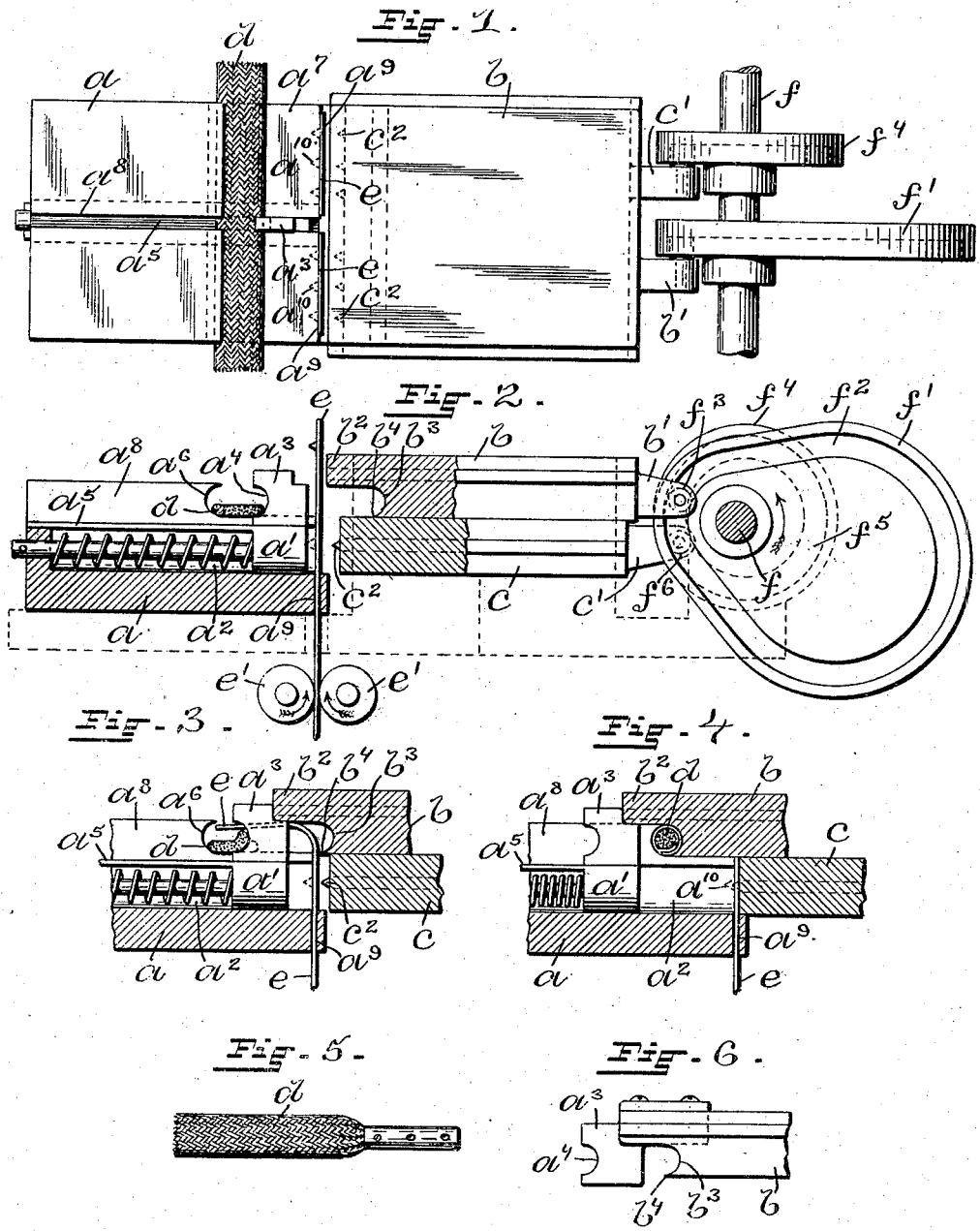

UNITED STATES PATENT OFFICE.

JOHN R. DENNIS, OF PROVIDENCE, RHODE ISLAND, ASSIGNOR TO PROVIDENCE TIPPING MACHINE COMPANY, OF PROVIDENCE, RHODE ISLAND.

MACHINE FOR TIPPING LACES.

SPECIFICATION forming part of Letters Patent No. 741,315, dated October 13, 1903.

Application filed March 28, 1903. Serial No. 149,915. (No model.)

*To all whom it may concern:*

Be it known that I, JOHN R. DENNIS, a citizen of the United States, residing at Providence, in the county of Providence and State of Rhode Island, have invented a new and useful Improvement in Machines for Tipping Lacings, of which the following is a specification.

This invention has reference to an improvement in machines for applying tips to shoe, corset, or similar lacings, and more particularly to an improvement in the dies for cutting and forming the tips on the lacings.

The objects of this invention are to cut off and form two tips simultaneously and to cut the lacing between the tip-blanks before they are formed on the lacing. By this method of forming the tips I increase the production and form a tip having all the characteristics of a tip made on a single-tipping machine.

My invention consists in the peculiar and novel construction of the dies, having means for cutting the lacing and for indenturing, cutting, and forming the two thin metal blanks over the lacings to form tips on the lacings, the dies consisting of a fixed die and two reciprocating dies, with means for operating the reciprocating dies and feeding the two strips of stock for the tip-blanks to the dies, as will be more fully set forth hereinafter.

Figure 1 is a plan view of the dies, showing the positions of the lacing, lacing-cutter, and the two strips of stock for forming the tips on the lacing. Fig. 2 is a side view, partly in section, showing the fixed die, the two reciprocating dies, the cams for operating the reciprocating dies, and the rolls for feeding the two strips of stock to the dies, the frame of the machine being shown in broken lines. Fig. 3 is a detail sectional view showing the position the dies would assume at the point of cutting the lacing and the two strips of metal stock for the tips. Fig. 4 is a detail view similar to Fig. 3, showing the completed operation of the dies. In this position the lacing has been cut, the tips formed on the ends of the lacing, and the two strips of stock indentured for the next tips. Fig. 5 is a view showing the tip on the end of a lacing; and Fig. 6 is a detail view of a modified form of the upper reciprocating die, showing the cutter for cutting the lacing attached to the die.

In the drawings, $a$ is the fixed die, $b$ the upper reciprocating die, and $c$ the lower reciprocating die. The fixed die $a$ is secured to the bed of the machine and has the spring-pressed plunger $a'$ working in the chamber $a^2$ in the die. The plunger $a'$ carries the cutter $a^3$ with the semicircular cutting edge $a^4$ and the shield $a^5$, covering the open upper part of the chamber $a^2$. The semicircular undercut recess $a^6$ extends transversely across the die and merges into the depressed face $a^7$ and is intersected centrally at right angles by the slot $a^8$ for the cutter $a^3$. In the base of the die are the two slots $a^9\ a^9$, forming guides for the two strips of stock $e\ e$, and on the inner edge are the indentures $a^{10}\ a^{10}$. The lacing $d$ is placed on the depressed face $a^7$ between the cutter $a^3$ and the semicircular recess $a^6$, as shown in the drawings. The stock $e\ e$, composed of two thin strips of metal, is fed upward through the guide-slots $a^9\ a^9$ by the feed-rolls $e'\ e'$, the width of the stock forming the length of the tip.

The reciprocating dies $b$ and $c$ slide on ways in the frame of the machine in the usual manner and are operated by cams on the power-shaft $f$, the cam $f'$, controlling the die $b$ through the groove $f^2$, engaging with the roll $f^3$ on the lug $b'$, forming a part of the die $b$, and the cam $f^4$, controlling the die $c$ through the groove $f^5$, engaging with the roll $f^6$ on the lug $c'$, forming a part of the die $c$. The die $b$ has the projecting end $b^2$ and the semicircular undercut recess $b^3$, extending transversely across the die and forming the cutting edge $b^4$ for cutting off the two strips of stock $e\ e$. The semicircular recesses $a^6$ and $b^3$ coincide when the dies are closed and form the tips on the lacing from the blanks cut off by the cutting edge $b^4$ from the two strips of stock $e\ e$. The die $c$ has on its inner edge the pins $c^2\ c^2$, coinciding with the indentures $a^{10}\ a^{10}$ in the fixed die $a$. The inward movement of the die, with the pins $c^2\ c^2$ forcing the metal of the stock $e\ e$ into the indentures $a^{10}\ a^{10}$, forms a series of points on the inside of the tip to assist in holding the tips on the lacing.

In the modified form (shown in Fig. 6) the cutter $a^3$ is attached to the die $b$ by screws or similar means and works in the slot $a^8$ in the fixed die, simplifying the construction of the parts for cutting the lacing.

In the operation of applying the tips the lacing is placed on the depressed face $a^7$ of the fixed die, between the cutter $a^3$ and the semicircular recess $a^6$, as shown in Figs. 1 and 2. The two strips of stock $e\ e$ are fed upward for a predetermined distance by an intermittent motion of the feed-rolls $e'\ e'$. The reciprocating dies $b$ and $c$ are advanced against the fixed die by the cams, the die $c$ making indentures to form points on the inside of the two strips of stock $e\ e$. The die $b$ in advancing strikes the ends of the two strips of stock $e\ e$, bends them over and into the semicircular recess $a^6$ in the fixed die, and the end $b^2$ engages with the cutter $a^3$ on the spring-pressed plunger $a'$. The cutter is now advanced with the die against the tension of the spring on the plunger $a'$ and cuts the lacing. The cutting edge $b^4$ of the die $b$ has now cut off the tip-blanks, and the coinciding of the semicircular recesses $a^6$ of the fixed die and $b^3$ of the reciprocating die forms the tips by forcing the blanks around the ends of the lacings, as shown in Fig. 4. The cutter $a^3$ on the spring-pressed plunger $a'$ returns to its original position when released by the reciprocating die $b$, and the cuttings from the lacing are prevented from entering the chamber $a^2$ by the shield $a^5$ on the plunger $a'$.

By this construction and operation the lacing is cut, and two tips are formed on the ends of the lacing simultaneously in one operation of the dies, increasing the production and lessening the cost of the lacings.

Having thus described my invention, I claim as new and desire to secure by Letters Patent—

1. In a tipping-machine for lacings, means consisting of a fixed die and a reciprocating die for forming two tips from two separate pieces of stock simultaneously on the lacing in one operation of the dies and without removing the lacing from the dies, substantially as described.

2. In a tipping-machine for lacings, a set of dies, consisting of a fixed die and reciprocating dies constructed to first cut the lacing and to then form two tips simultaneously on the ends of the cut lacing in one operation of the dies without removing the lacing from the dies, as described.

3. In a tipping-machine for lacings, a set of dies constructed to first cut the lacing and then form two tips on the two abutting ends of the lacing simultaneously, and means for feeding stock for the tips to the dies, consisting of feed-rolls having an intermittent motion, as described.

4. In a tipping-machine for lacings, a set of dies consisting of a fixed die and two reciprocating dies, means for feeding two strips of metal to the dies for the tips, means on the fixed die to cut the lacing, means consisting of the dies for cutting and forming the two metal strips into tips on the ends of the lacing, and means for operating the reciprocating dies, as described.

5. In a tipping-machine for lacings, a set of dies consisting of upper and lower reciprocating dies and a fixed die, means for feeding two strips of metal to the dies for the tips, means on the lower reciprocating die and the fixed die to form a series of points on the two strips of metal, means on the upper reciprocating die and the fixed die to cut the metal strips and form them simultaneously into two tips on the lacing, means on the fixed die to cut the lacing, and means to operate the reciprocating dies, as described.

6. In a tipping-machine, the combination of the fixed die $a$ having the spring-pressed plunger $a'$ working in the chamber $a^2$, the cutter $a^3$ with the semicircular cutting edge $a^4$ and the shield $a^5$ on the plunger, the semicircular undercut recess $a^6$ extending across the die and merging into the depressed face $a^7$, the centrally-intersecting slot $a^8$ for the cutter $a^3$, the two slots $a^9\ a^9$ forming guides for the two strips of metal stock $e\ e$ and the indentures $a^{10}\ a^{10}$ on the inner edge of the die, the reciprocating die $b$ having the projecting end $b^2$ and the semicircular undercut recess $b^3$ extending across the die and forming the cutting edge $b^4$, the reciprocating die $c$ having the series of pins $c^2\ c^2$, means for feeding the two strips of metal stock $e\ e$ to the dies, and means for operating the reciprocating dies, all for the purpose as described.

In testimony whereof I have signed my name to this specification in the presence of two subscribing witnesses.

JOHN R. DENNIS.

Witnesses:
ADA E. HAGERTY,
J. A. MILLER, Jr.